US011483251B1

(12) United States Patent
Walrand et al.

(10) Patent No.: US 11,483,251 B1
(45) Date of Patent: Oct. 25, 2022

(54) CONFIGURATION OF TIME-SENSITIVE NETWORKS

(71) Applicant: Ethernovia Inc., San Jose, CA (US)

(72) Inventors: Jean C. Walrand, Berkeley, CA (US); Roy T. Myers, Jr., Santa Clara, CA (US); Darren S. Engelkemier, Menlo Park, CA (US); Hossein Sedarat, San Jose, CA (US); Ramin Shirani, Morgan Hill, CA (US)

(73) Assignee: Ethernovia Inc., San Jose, CA (US)

( * ) Notice: Subject to any disclaimer, the term of this patent is extended or adjusted under 35 U.S.C. 154(b) by 31 days.

(21) Appl. No.: 17/249,825

(22) Filed: Mar. 15, 2021

Related U.S. Application Data

(60) Provisional application No. 62/990,021, filed on Mar. 16, 2020.

(51) Int. Cl.
*H04L 47/56* (2022.01)
*H04L 47/32* (2022.01)
*H04L 45/02* (2022.01)
*H04L 67/12* (2022.01)

(52) U.S. Cl.
CPC .............. *H04L 47/56* (2013.01); *H04L 45/02* (2013.01); *H04L 47/32* (2013.01); *H04L 67/12* (2013.01)

(58) Field of Classification Search
CPC ......... H04L 47/56; H04L 45/02; H04L 47/22; H04L 47/30; H04L 47/32; H04L 47/36; H04L 47/2441; H04L 47/2483; H04L 49/111; H04L 49/30; H04L 49/50; H04L 49/90; H04L 67/12
See application file for complete search history.

(56) References Cited

U.S. PATENT DOCUMENTS

| 7,535,841 | B1 * | 5/2009 | Beshai | ............... | H04Q 11/0066 370/230.1 |
| 7,756,141 | B1 * | 7/2010 | Beshai | ................... | H04L 47/10 709/239 |
| 2015/0319213 | A1 * | 11/2015 | Lida | ...................... | H04L 65/612 709/219 |

* cited by examiner

*Primary Examiner* — Mohamed A Kamara
(74) *Attorney, Agent, or Firm* — Schwegman Lundberg & Woessner, P.A.

(57) ABSTRACT

Disclosed are systems, methods, and non-transitory computer-readable media for configuration of time-sensitive networks. Time-sensitive networks utilize traffic shaping to provide for efficient and predictable flows of data through the network. A network configuration tool can be used to determine how data should be routed and shaped through the network towards its destination. The network configuration tool calculates the maximum burst size at an output port of a switch by analyzing groups of data flows that pass through the output port, rather than analyzing the data flows individually.

20 Claims, 10 Drawing Sheets

800 ⤹

```
┌─────────────────────────────────────────────┐
│ IDENTIFY A GROUP OF DATA FLOWS THAT PASS    │
│         THROUGH AN OUTPUT PORT OF A SWITCH  │
│                     802                     │
└─────────────────────────────────────────────┘
                       │
                       ▼
┌─────────────────────────────────────────────┐
│ DETERMINE A FIRST BURST SIZE VALUE FOR EACH │
│ INPUT PORT OF THE SWITCH BASED ON DATA      │
│ RECEIVED AT THE INPUT PORT THAT PASSES      │
│ THROUGH THE OUTPUT PORT AND IS INCLUDED IN  │
│ THE GROUP OF DATA FLOWS                     │
│                     804                     │
└─────────────────────────────────────────────┘
                       │
                       ▼
┌─────────────────────────────────────────────┐
│ DETERMINE A SECOND BURST SIZE VALUE FOR     │
│ EACH INPUT PORT OF THE SWITCH BASED ON DATA │
│ RECEIVED AT THE INPUT PORT THAT PASSES      │
│ THROUGH THE OUTPUT PORT AND IS NOT INCLUDED │
│ IN THE GROUP OF DATA FLOWS                  │
│                     806                     │
└─────────────────────────────────────────────┘
                       │
                       ▼
┌─────────────────────────────────────────────┐
│ DETERMINE A BURST SIZE VALUE OF THE GROUP   │
│ OF DATA FLOWS AT THE OUTPUT PORT BASED ON   │
│ THE FIRST BURST SIZE VALUE AND THE SECOND   │
│ BURST SIZE VALUE DETERMINED FOR EACH INPUT  │
│ PORT OF THE SWITCH                          │
│                     808                     │
└─────────────────────────────────────────────┘
```

FIG. 8

CONFIGURATION OF TIME-SENSITIVE NETWORKS

CROSS-REFERENCE TO RELATED APPLICATIONS

The present application claims the benefit of priority of U.S. Provisional Application No. 62/990,021, filed on Mar. 16, 2020, which is incorporated herein by reference in its entirety.

TECHNICAL FIELD

An embodiment of the present subject matter relates generally to networks, and more specifically, to configuration of time-sensitive networks.

BACKGROUND

Safety-critical technologies, such as Advanced Driver-Assistance Systems (ADAS), have stringent demands for safety and reliability that require network communication with predictable network latency and guaranteed bandwidth. In many cases, these technologies function using multiple synchronized systems that process a high volume of data received from different parts of the vehicle. For example, emergency braking functionality uses a detection system to monitor sensor data for obstacles, a collision avoidance system that determines whether a collision with an obstacle is likely, and a braking system that activates the vehicle's brakes. If a collision with an obstacle is likely, the collision avoidance system notifies the braking system to activate the brakes. Communication between the detection, collision avoidance and braking systems is therefore critical as a delay in applying the vehicle's brakes could be catastrophic. Time-Sensitive Networking with Ethernet is currently used to provide network communication with predictable latency and guaranteed bandwidth, however meeting the ever-increasing technological demands remains a challenge.

BRIEF DESCRIPTION OF THE DRAWINGS

Various ones of the appended drawings merely illustrate example embodiments of the present disclosure and cannot be considered as limiting its scope.

FIG. 8 is a flowchart showing a method for calculating burst size based on groups of data flows, according to some example embodiments

DETAILED DESCRIPTION

Figure 1:
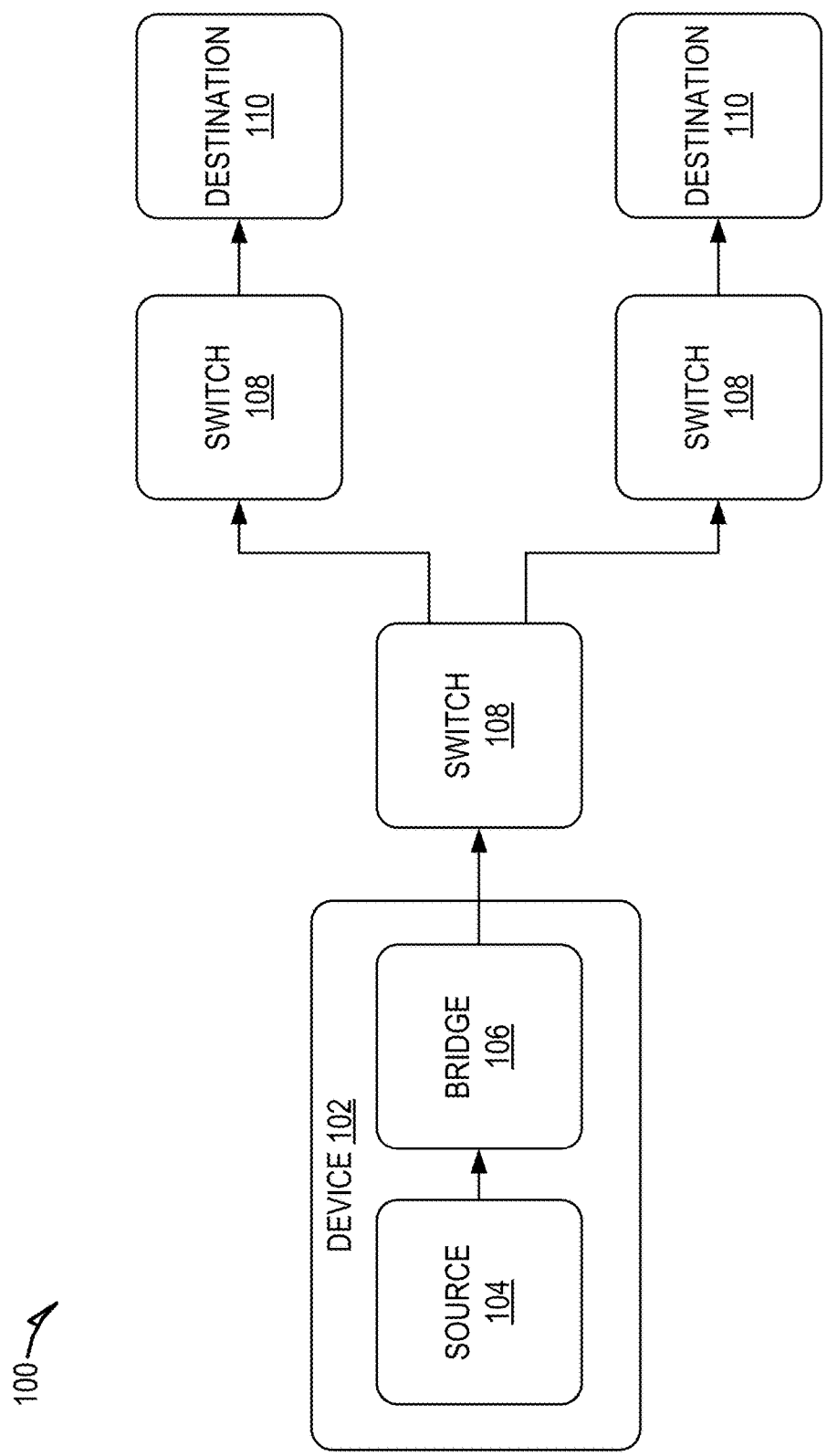
FIG. 1 is a block diagram of a time-sensitive network, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Disclosed are systems, methods, and non-transitory computer-readable media for configuration of time-sensitive networks. Time-sensitive networks utilize traffic shaping to provide for efficient and predictable flows of data through the network. Traffic shaping is the process of distributing data packets evenly over a period of time to avoid large bursts of data that may overwhelm the buffers in subsequent bridges/switches along the path.

When designing a time-sensitive network, a network configuration tool can be used to determine how data should be routed and shaped through the network towards its destination. For example, the network configuration tool analyzes data describing the devices in the network, the network topology, data flows, and the like, and generates routing parameters defining the sequence of switches through which data flows should be routed to reach their intended destinations, as well as how the data should be shaped at each switch. The network configuration tool also calculates performance guarantees defining the bounds on buffer sizes and delays at the various bridges/switches. For example, the network configuration tool determines the maximum memory occupancy that can be achieved at the output port of each switch, as well the maximum delay for data packets passing through the output port of each switch.

To determine the bounds on the buffer size and delay at an output port, the network configuration tool calculates a maximum burst size that can be achieved at the output port. The maximum burst size indicates the maximum size of data that can be received at the output port during a given time period. The maximum burst size at an output port can be used to determine the maximum memory occupancy that can be achieved at the output port, which is used to determine the appropriate buffer size.

Current methods for calculating the maximum burst size at an output port consider each data flow that passes through the output port individually, rather than as a group. These methods initially determine a maximum burst of each of the individual data flows that passes through the output port of a switch and then determine the maximum burst size of the output port based by summing the maximum burst size of the individual data flows. This process, however, often results in an over estimation of the maximum burst size at the output port, which results in an overestimated bound on the buffer sizes needed for the switches and the latency through the switch. Accordingly, use of these methods to design time-sensitive networks may result in unnecessarily large buffer sizes and link rates, which can significantly increase the cost of the network.

To alleviate this issue, the network configuration tool calculates the maximum burst size at an output port of a switch by analyzing groups of data flows that pass through the output port, rather than analyzing the data flows individually. The network configuration tool calculates the maximum burst size of a group of data flows based on an analysis of data received at each input port of the switch. For example, for each input port of the switch, the network configuration tool calculates both a burst size of data received at the input port that is included in the group of data flows passes through the output port, and a burst size of data received at the input port that passes through the output port, but is not included in the group of data flows. As will be illustrated in greater detail below, the network configuration tool calculates the maximum burst size of the group of data flows at the output port based on these individual burst sizes calculated at each input port. Moreover, the network configuration tool identifies the largest possible groups of flows that have to be considered in the network analysis, thus resulting in the smallest possible upper bounds on storage and latency.

FIG. 1 is a block diagram of a time-sensitive network 100, according to some example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 1. However, a skilled artisan will readily recognize that various additional functional components may be supported by the time-sensitive network 100 to facilitate additional functionality that is not specifically described herein.

The time-sensitive network 100 is comprised of a collection of nodes (e.g., devices 102, switches 108, and destinations 110), which are interconnected via communication links for transporting data between the nodes. The communication links may include one or more wired communication links, one or more wireless communication links, or any combination thereof. In some embodiments, some of the links may be optical, either in free space or guided by an optical fiber. Each node in the time-sensitive network 100 may be a redistribution point or an endpoint that can receive, create, store, replicate, or send data along distributed network routes. For example, each node, whether an endpoint or a redistribution point, can have either a programmed or engineered capability to recognize, process and forward data transmissions to other nodes in the time-sensitive network 100.

The time-sensitive network 100 may be implemented in any of a variety of applications to provide for network communication with predictable latency and guaranteed bandwidth. For example, the time-sensitive network 100 may be implemented within a vehicle (e.g., automobile, truck, airplane, ship, etc.) to provide for various electronics features and functionality, including safety-critical features, such as ADAS.

A shown in FIG. 1, the time-sensitive network 100 includes a device 102 connected to multiple destinations 110 through a series of switches 108. Although FIG. 1 shows the time-sensitive network 100 as including only one device 102, three switches 108 and two destinations 110, this is just for ease of explanation and is not meant to be limiting. The time-sensitive network 100 may include any number of devices 102, destinations 110, and switches 108

The device 102 may be any type of electrical component that produces a data flow of packets (e.g., generates and transmits data and transmits) to one or more destinations 110 in the time-sensitive network 100. For example, a device 102 may be a sensor, computing device, input device, and the like. The destination 110 may be any type of electrical component that receive data packets as part of data flows that travel through the time-sensitive network 100. For example, a destination 110 may include a display, actuator, computing device, speakers, other output device, and the like. A switch 108 may be any type of electrical component within the time-sensitive network 100 that can receive data packets included in a data flow and forward the data towards its intended destination 110. The device 102, destinations 110 and switches 108 can include some or all of the features, components, and peripherals of the machine 1000 shown in FIG. 10.

As shown, the device 102 includes a source 104 and a bridge 106. Although the device 102 is shown as including one source 104, this is just one example and is not meant to be limiting. The device 102 may include multiple sources 104, each of which may be attached to the bridge 106.

The source 104 generates data and the bridge 106 transmits the data to its intended destinations 110. For example, the bridge 106 transmits the data to an appropriate switch 108 along a defined path to its destination 110. Each switch 108 that receives the data may forward the data to the next point along the defined path (e.g., one or more switches 108) until the data arrives at its destination 110. Although the bridge 106 is shown as being connected to a single switch 108, this is just one example and is not meant to be limiting. The bridge 106 may be connected to multiple switches 108. Similarly, the time-sensitive network 100 may include any number of switches 108 and a data flow may travel through any number of switches 108 as it travels from a device 102 to its destination 110. Further, data packets included in the data flow may replicated at any of the switches 108 as needed.

As explained earlier, the time-sensitive network 100 uses traffic shaping to provide for efficient and predictable flows of data through the network. For example, data packets are distributed evenly over a period of time to avoid large bursts of data that may overwhelm the buffers in subsequent nodes (e.g., switches 108) along the path. The bridge 106 facilitates the process of evenly distributing the data packets. For example, the bridge 106 distributes a burst of data based on a set of shaping parameters that define the size and rate at which the data it to be distributed.

Figure 2:
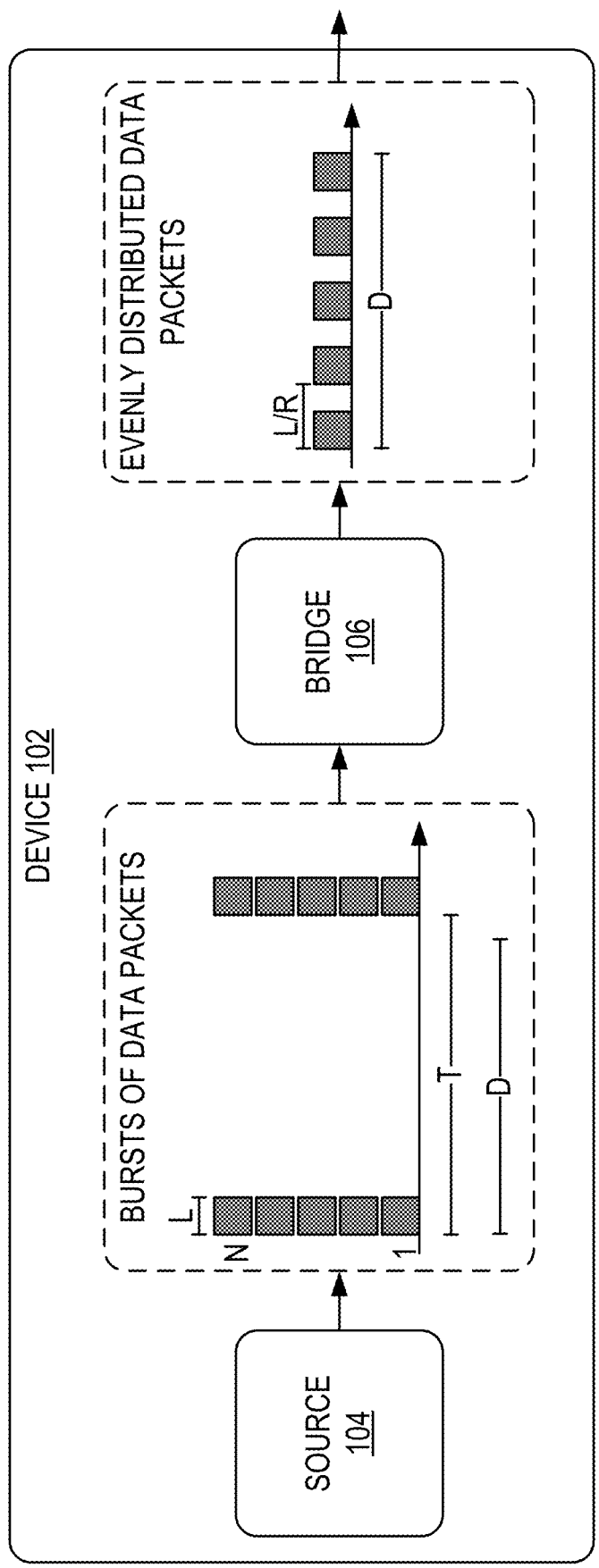
FIG. 2 illustrates the process of traffic shaping performed by a bridge, according to some example embodiments.

FIG. 2 illustrates the process of traffic shaping performed by a bridge 106, according to some example embodiments. As shown, the bridge 106 receives bursts of data packet at set time intervals (T). The size of the burst of data packets is defined by the number (N) of data packets in the burst and the size (L) of each individual data packet (e.g., number of bytes included in each data packet). As shown, the bridge 106 distributes the data packets evenly over a defined period of time (D) referred to as the delay. The length of the delay (D) may be based on the set time intervals (T) at which the bursts of data packets are received by the bridge 106. For example, the length of the delay (D) may be shorter than the set time intervals (T) to allow the bridge 106 to fully distribute each burst of data packets before receiving a subsequent burst of data packets.

While FIG. 2 describes the traffic shaping process performed by a bridge 106, the switches 108 in the time-sensitive network 100 may also shape traffic in a similar manner. For example, the output ports of each switch 108 may perform similar functionality as described in relation to the bridge 106 to shape bursts of data packets transmitted by the output port.

Figure 3:
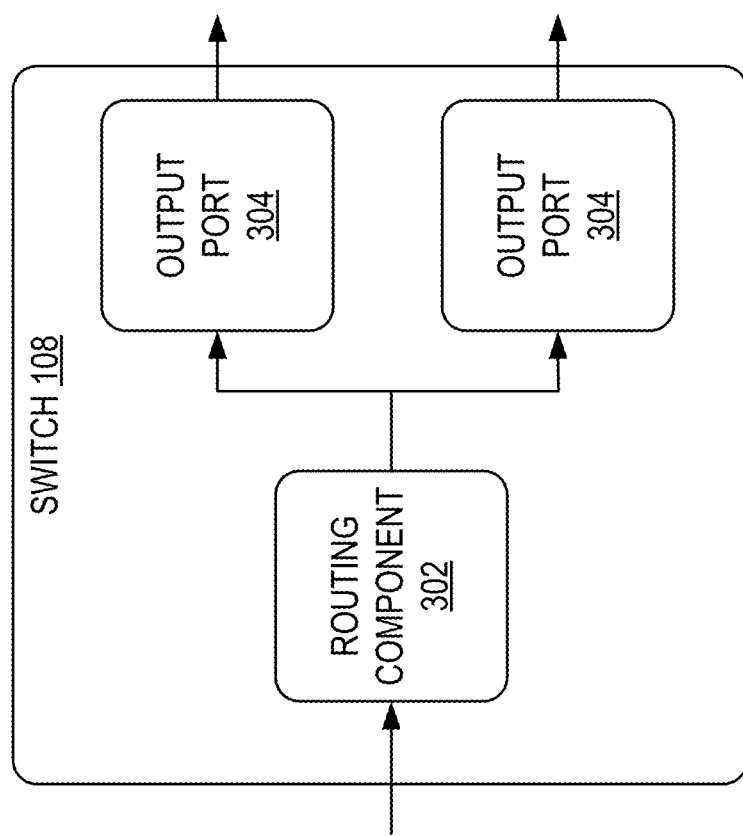
FIG. 3 shows a switch configured to shape traffic, according to some example embodiments.

FIG. 3 shows a switch 108 configured to shape traffic, according to some example embodiments. As shown, the switch 108 includes a routing component 302 and output ports 304. The routing component 302 routes data received by the switch 108 to an appropriate output port 304, where the data is then distributed to the next node along its data path. The routing component 302 provides data to the output ports 304 in bursts of data packets at set time intervals, as shown in relation to the bridge 106. The output ports 304 similarly distribute the data packets included in the burst of data packets evenly over a defined delay time. The burst of data packets received at each output port 304 may include data packets from multiple data flows. For example, the burst of data packets received at an output port 304 may include data packet that originated from different sources 104 and/or data packets that are travelling to different destinations 110.

Figure 4:
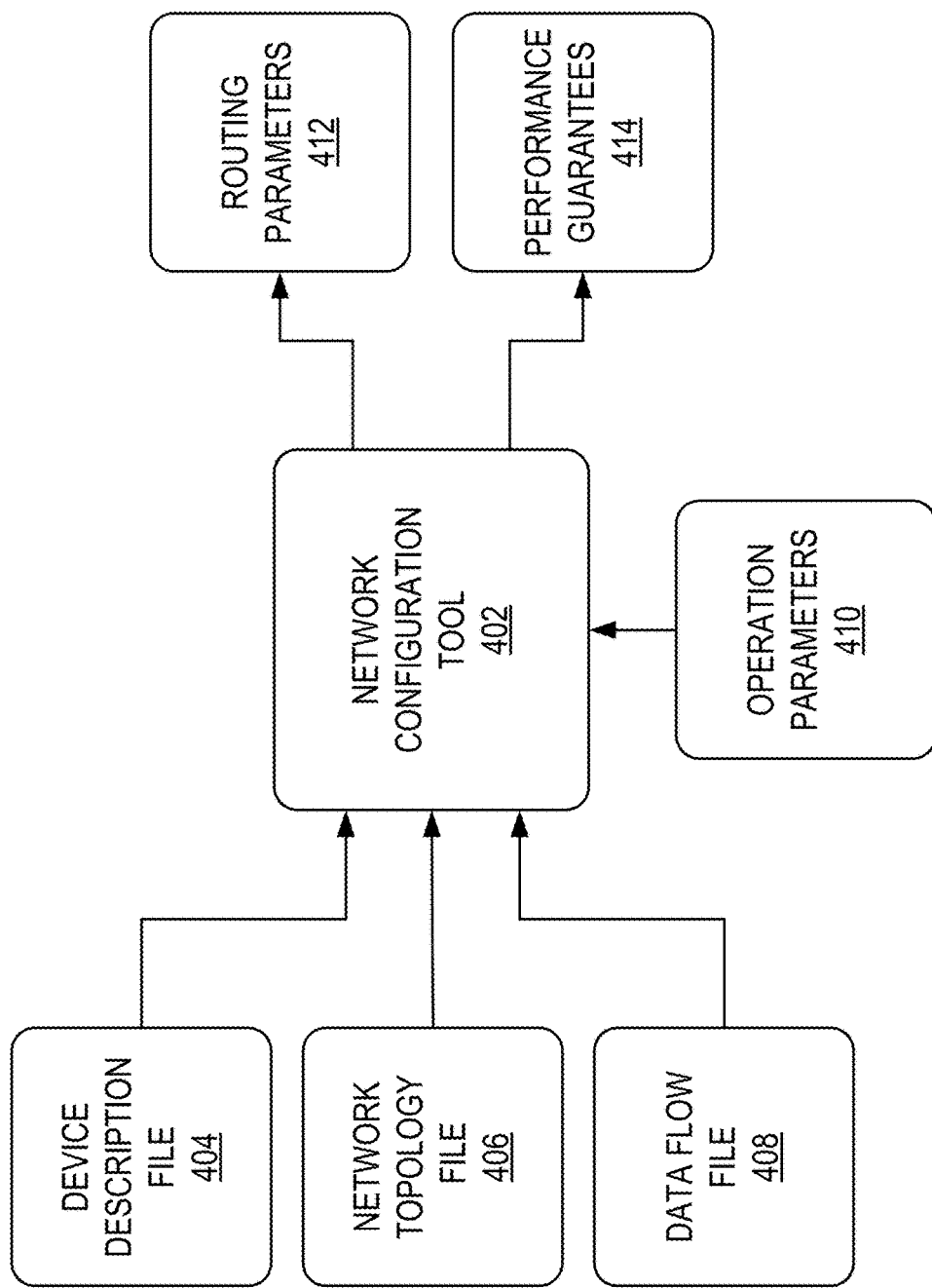
FIG. 4 is a block diagram of a network configuration tool for designing a time-sensitive network, according to some example embodiments.

FIG. 4 is a block diagram of a network configuration tool 402 for designing a time-sensitive network 100, according to some example embodiments. The network configuration tool 402 may be comprised of a combination of software and hardware. For example, the network configuration tool 402 may be comprised of software executing on a computing device that includes some or all of the features, components, and peripherals of the machine 1000 shown in FIG. 10.

As shown, the network configuration tool 402 receives a set of network description files 404, 406, 408 and operation parameters 410 as input, which the network configuration tool uses to generate a set of routing parameters 412 and performance guarantees 414.

The set of network description files 404, 406, 408 includes individual files defining various aspects of a time-sensitive network 100. For example, the set of network description files 404, 406, 408 includes a device description file 404, a network topology file 406, and a data flow file 408. The set of network description files 404, 406, 408 may be created using any of a variety of formats, such as Excel spreadsheet, JavaScript Object Notation (JSON), Hypertext Markup Language (HTTP), and the like.

The device description file 404 includes data listing the devices 102 to be included in the time-sensitive network 100. As explained earlier, each device 102 includes one more sources 104 that produce data and provide bursts of data packet to a bridge 106 at set time intervals. The bridge 106 transmits the received data to its intended destinations 110 utilizing traffic shaping to distribute the data packets evenly over a defined period of time. The device description file 404 may define each of the devices 102 based on a set of variables defining this functionality. For example, the device description file may characterize the devices based on the size (L) of the data packets in the burst, the number (N) of data packets in the burst, the set time intervals (T) at which the burst are provided to the bridge 106, and the defined period of time (D) during which the bridge distributes the data packets in the burst.

The network topology file 406 specifies the interconnections (e.g., communication links) between the devices 102, switches 108 and destinations 110 in the time-sensitive network 100. For example, the network topology file 406 may define the capacity of the communication links that connect each of these nodes (e.g., devices 102, switches 108, destinations 110) in the time-sensitive network 100. The capacity of a communication link is the rate at which the communication link transmits bits of data. The network topology file 406 may include data identifying the input port and output port 304 of the nodes (e.g., devices 102, switches 108, destinations 110) that are connected by each communication link.

The data flow file 408 specifies the flows of data that will be distributed through the time-sensitive network 100 from the devices 102 to the destinations 110. Each data flow in the data flow file 408 can be specified by the source 104 and/or device 102 from which it originates as well as the one or more destinations 110 to which it the data is delivered. The data flow file 408 may also specify additional characteristics of each data flow, such as a priority and/or degree of protection against failures. The degree of protection defines actions that should be performed to provide adequate protection for specified data flows, such as actions to be performed in the event of a failure. For example, the data flow file 408 may specify that a data flow be rerouted in the event of a communicate link or switch 108 failure. As another example, the data flow file 408 may define the use of redundancy to protect against failure. For example, data flow file 408 may specified that data packets in specified data flows be duplicated and transmitted along disjointed paths towards their intended destination.

The operation parameters 410 describe the form of any multicasting to be implemented as data is distributed through the time-sensitive network 100 and the over-shaping rate (OSR). For example, the operation parameters 410 may define that multicasting be performed at the source 104 of data and/or the switches 108 through which the data is transported. In the case of multicasting performed at the source 104, the source 104 generates separate copies of the data packet for each of its intended destinations. Alternatively, in the case of multicasting performed at the switches 108, the switches 108 replicate the data packet. For example, data packets can be duplicates at switches 108 along the data path to ensure that two copies of a packet do not travel along the same link. The over-shaping rate OSR specifies the shaping rate of the switches 108 as will be discussed in greater detail in the discussion that follows.

The network configuration tool 402 generates routing parameters 412 defining the sequence of switches 108 through which data flows originating from device 102 should be routed to reach their intended destinations 110, as well as how the data should be shaped at the device 102 and switches 108. The network configuration tool 402 also calculates performance guarantees defining the bounds on buffer sizes and delays at the various bridges 106 and switches 108. For example, the network configuration tool 402 determines the maximum memory occupancy that can be achieved at the output port of each switch, as well the maximum delay for data packets passing through the output port of each switch The network configuration tool 402 uses the aforementioned inputs to generate a set of routing parameters 412 and performance guarantees 414. The set of routing parameters 412 define the sequence of switches 108 through which data flows should be routed to reach their intended destinations 110, as well as how the data should be shaped at each switch 108. The network configuration tool 402 also calculates performance guarantees defining the bounds on buffer sizes and delays at the various switches 108. For example, the network configuration tool 402 determines the maximum memory occupancy that can be achieved at each output port 304 of each switch 108, as well the maximum delay for data packets passing through the output ports 304 of each switch 108.

The network configuration tool 402 generates the set of routing parameters 412 and performance guarantees 414 by calculating a maximum burst size that can be achieved at each the output ports 304 used to transmit data in the time-sensitive network. The maximum burst size indicates the maximum size of data that can be received at the output port during a given period of time. The maximum burst size at an output port 304 can be used to determine the appropriate buffer size for the output port 304 as well as the maximum delay for data packets passing through the output port 304.

Current methods for calculating the maximum burst size at an output port 304 consider each data flow that passes through the output port 304 individually, rather than as a group, which may result in an over estimation of the maximum burst size. Accordingly, use of these methods to design a time-sensitive networks 100 may result in unnecessarily large buffer sizes, which can significantly increase cost.

To alleviate this issue, the network configuration tool 402 calculates the maximum burst size at an output port 304 of a switch by analyzing groups of data flows that pass through the output port 304, rather than analyzing the data flows individually. The network configuration tool 402 calculates the maximum burst size of a group of data flows based on an analysis of data received at each input port of the switch 108, as described in the discussion that follows.

Figure 5:
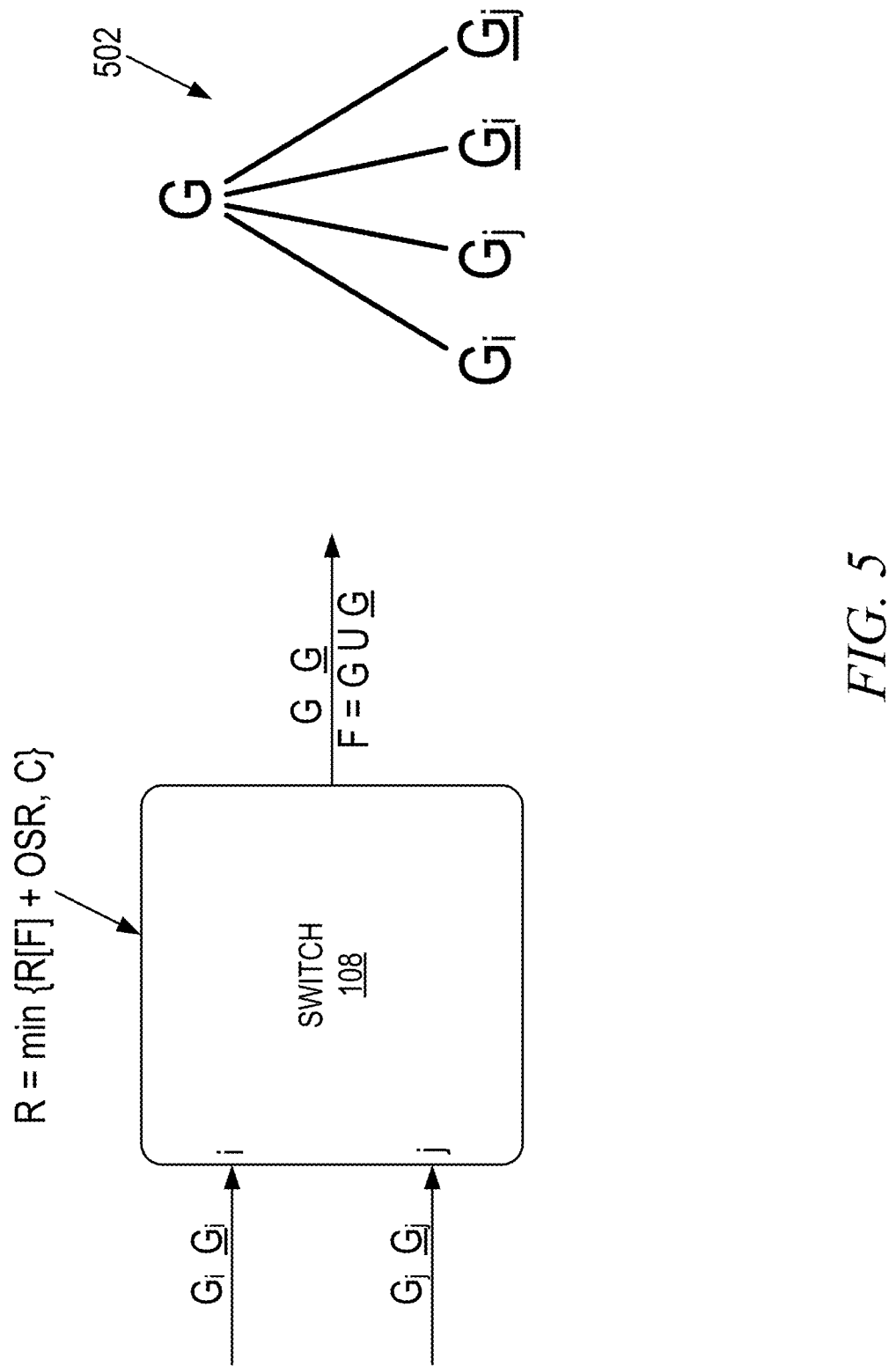
FIG. 5 illustrates calculating the maximum memory occupancy and the maximum delay for data packets passing through an output port of a switch, according to some example embodiments.

FIG. 5 illustrates calculating the maximum memory occupancy and the maximum delay for data packets passing through an output port 304 of a switch 108, according to some example embodiments. As shown, the switch 108 includes two input ports i, j for receiving data and an output port 304 through which data is transmitted to other nodes in a time-sensitive network 100. To calculate the maximum memory occupancy and the maximum delay for data packets passing through the output port 304, the burst size at the output port 304 is determined based on groups of data flows. To calculate the burst size for a group (G) of data flows that pass through an output port 304, the data that passes through the output port 304 is segmented into two distinct subsets of the data (G and $\underline{G}$) based on whether the data is or is not included in the group (G). For example, one of the subsets of the data (G) includes the data from the group of data flows, and the other subset of the data ($\underline{G}$) includes data that passes through the output port that is not a part of the group of data flows.

A similar process is performed at each input port i of the switch. For example, the data that passes through an input port i can be segmented into one subset of the data ($G_i$) that consists of data that is included in the group G and another subset of the data ($\underline{G}_i$) that consists of data that is not included in the group G.

This process provides a hierarchical tree 502 representing the flow of data that passes through the output port 304 of the switch 108. As shown, the node G in the tree 502 corresponds to the set G that passes through the output port of the switch 108 and the child nodes (Gi, $\underline{G}i$, Gj, $\underline{G}j$) represent the segmentations of the data received at each input ports i, j of the switch 108 that pass through the output port 304.

The tree 502 is used to formulate the following equation that relates the burst size of the group (B[G]) as it leaves the output port 304 of the switch 108 to the burst sizes (B[$G_i$], B[$\underline{G}_i$]) of the groups $G_i$ and $\underline{G}_i$ as they enter the switch.

$$B(G) = \begin{bmatrix} \sum_i B[G_i] + \sum_i B[G_i]R[G]/R \\ L[G], \text{ if } G = [\ ] \text{ and } OSR = 0 \end{bmatrix}$$

As illustrated in the above equation by the relation between B[G] and (B[$G_i$], B[$\underline{G}_i$]), the burst sizes are characteristics of groups of flows on a given input link. In the above equation, the expressions R[G] is the sum of the shaping rates of the flows in G and L[G] is the length of the largest packet in group G. Further, the expression $\underline{G}$=[ ] defines a condition that there is no flow in $\underline{G}$, (e.g., that G consists of all the flows that use that output port 304). These relations, when written for all the output ports 304 and for all of the possible groups of flows, correspond to linear equations of the form x=Ax+b. In these equations, x is the vector whose components are all the values of B[G] for all the sets of flows and links in the time-sensitive network 100 and the components of b are the values of L[G] for all the possible groups of flows.

These equations are used by the network configuration tool 402 to derive the values of B[G]. The network configuration tool 402 may then use these derived values to calculate the maximum memory occupancy (M) and the maximum delay (D) that correspond to a given output port 304 of a switch 108. For example, the network configuration tool 402 uses the following algorithm to calculate the maximum memory occupancy (M).

$$M = \Sigma_i B[G_i] + \Sigma_i B[\underline{G}_i]$$

The network configuration tool 402 may then use the determined maximum memory occupancy (M) along with the following algorithm to calculate the maximum delay (D).

$$D = M/R$$

In some embodiments, the network configuration tool 402 identifies the subset of components of the vectors x and b that should be calculated. To perform this identification, the network configuration tool 402 constructs the tree 502 by proceeding from the group of flows that leaves a switch 108 to reach a destination 110. This group is represented as the root of the tree 502. The network configuration tool 402 determines the children of that root, the children of those children, and so on, until a node in the tree 502 corresponds to a group of flows that leaves a bridge 106 or repeats a node in the tree 502 that is closer to the root. This construction of a destination-based tree 502 greatly reduces the complexity when calculating the maximum memory occupancy (M) and the maximum delay (D).

Figure 6:
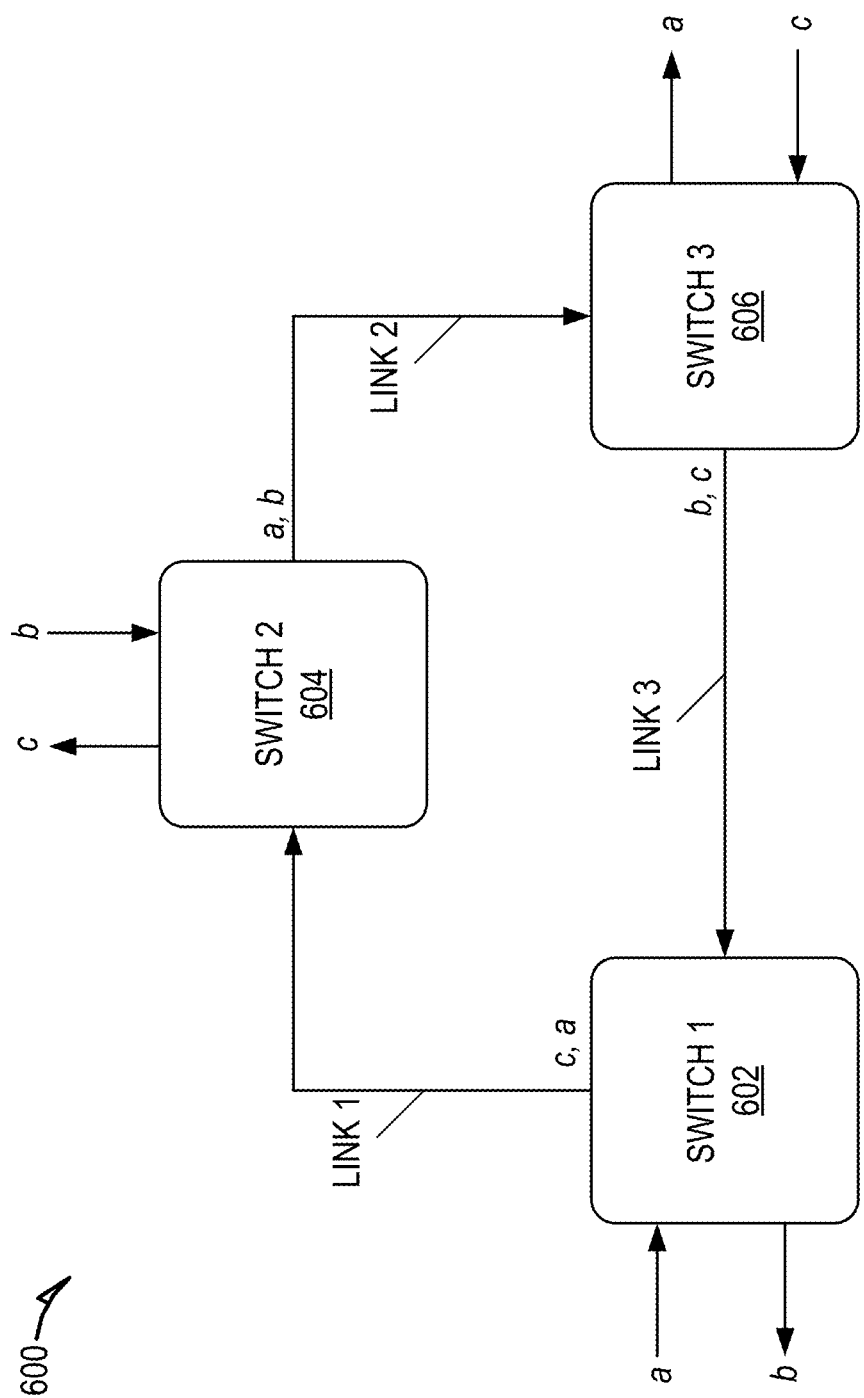
FIG. 6 shows data flows in a time-sensitive network, according to some example embodiments.

FIG. 6 shows data flows in a time-sensitive network 600, according to some example embodiments.

As shown, the time-sensitive network 600 includes three switches 602, 604, 606. Three data flows a, b, c pass through the three switches 602, 604, 606. Data flow A enters the time-sensitive network 600 at switch 1 602, passes through link 1 to switch 2 604, passes through link 2 to switch 3 606, and then leaves the time-sensitive network 600. Data flow b enters the time-sensitive network 600 at switch 2 604, passes through link 2 to switch 3 606, passes through link 3 to switch 1 602, and then leaves the time-sensitive network 600. Data flow c enters the time-sensitive network 600 at switch 3 606, passes through link 3 to switch 1 602, passes through link 1 to switch 2 604, and then leaves the time-sensitive network 600. As shown, none of the data flows a, b, c, passes twice through a single link.

Using the previously described to calculate the burst sizes at the out ports through which each of the data flows a, b, c, passes produces the following equations.

$$\begin{bmatrix} B_1[a] \\ B_2[b] \\ B_3[c] \end{bmatrix} = \begin{bmatrix} 0 & 0 & R[a]/R_1 \\ R[b]/R_2 & 0 & 0 \\ 0 & R[c]/R_3 & 0 \end{bmatrix} \begin{bmatrix} B_1[a] \\ B_2[b] \\ B_3[c] \end{bmatrix} + \begin{bmatrix} L[a] \\ L[b] \\ L[c] \end{bmatrix}$$

$$\begin{bmatrix} B_1[c] \\ B_2[a] \\ B_3[b] \end{bmatrix} = \begin{bmatrix} 0 & 0 & 1 \\ 1 & 0 & 0 \\ 0 & 1 & 0 \end{bmatrix} \begin{bmatrix} B_1[a] \\ B_2[b] \\ B_3[c] \end{bmatrix} + \begin{bmatrix} L[a]R[c]/R_1 \\ L[b]R[a]/R_2 \\ L[c]R[b]/R_3 \end{bmatrix}$$

In these equations, for f=a, b, c and i=1, 2, 3, $B_i[f]$ indicates the burst size of flow f on link i for f=a, b, c. In the equations, i=1, 2, 3, L[f] indicates the maximum length of a packet of flow f, R[f] is the rate of flow f, and $R_i$ is the rate at which link i transmits packets. The above equations admit the following solution.

$$\begin{bmatrix} B_1[a] \\ B_2[b] \\ B_3[c] \end{bmatrix} = \begin{bmatrix} 1 & 0 & -R[a]/R_1 \\ -R[b]/R_2 & 1 & 0 \\ 0 & -R[c]/R_3 & 1 \end{bmatrix}^{-1} \begin{bmatrix} L[a] \\ L[b] \\ L[c] \end{bmatrix}$$

This solution allows for the maximum memory occupancy and the maximum latency in the switches 602, 604, 606 to be derived. For example, the maximum memory occupancy of the output port of switch 1 602 that leads to switch 2 604 is $B_3[c]+L[a]$ and the maximum latency is $(B_3[c]+L[a])/R_1$. The maximum occupancy for the other output port of switch 1 602 is $B_3[b]$ and the maximum latency is $B_3[b]/R_1$. The maximum memory occupancy and the maximum latency of the other output ports in the time-sensitive network 600 can be derived in a similar manner.

Figure 7:
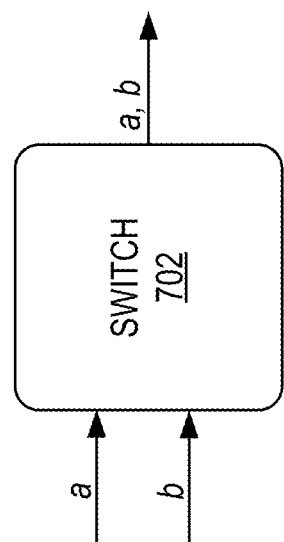
FIG. 7 shows data flows through a switch, according to some example embodiments.

FIG. 7 shows data flows through a switch 702, according to some example embodiments. As shown, the switch 702 includes two input ports and receive data flow a at one of the input ports and data flow b at the other input port. The switch 702 includes an output port through which both data flow a and data flow b exit the switch 702. To illustrate that considering data flows as groups, rather than individually, produces better bounds, the burst size at the output port of the switch 702 will be calculated using both methods.

The below equation represents calculating the burst size by considering the data flows as a group (e.g., G={a, b}) rather than calculating the burst size based on considering the data flows individually.

B[a,b]=L[a]+L[b]

Previous method for calculating the burst size calculate the burst size for each data flow individually and then add the two outputs to determine the burst size for the group of data flows. The below equation illustrates calculating the burst size for each data flow individually (B[a], B[b]) and then adding the values together (B[a]+B[b]) to determine the burst size for the group of data flows.

B[a]=L[a]+L[b]R[a]/R

B[b]=L[b]+L[a]R[b]/R

B[a]+B[b]=L[a]+L[b]+(L[a]R[b]+L[b]R[a])/R

As shown above, the resulting total burst size when calculating the burst size for each data flow individually is larger than when considering the data flows as a group. For example, if R[a]=R[b]=0.4R and L[a]=L[b]=L, then B[a, b]=2L and B[a]+B[b]=2.8L. Accordingly, the individual data flow based calculation yields bounds that are 40% larger than the group based calculation. Based on the output of the individual data flow-based calculation would result in designing switches 108 equipped with 40% more memory than is needed. The latency would similarly be overestimated. Use of the group-based procedure can therefore provide for more efficient and cheaper designs of time-sensitive networks.

FIG. 8 is a flowchart showing a method 800 for calculating burst size based on groups of data flows, according to some example embodiments. The method 800 may be embodied in computer readable instructions for execution by one or more processors such that the operations of the method 800 may be performed in part or in whole by a network configuration tool 402; accordingly, the method 800 is described below by way of example with reference to the network configuration tool 402. However, it shall be appreciated that at least some of the operations of the method 800 may be deployed on various other hardware and/or software configurations and the method 800 is not intended to be limited to the network configuration tool 402.

At operation 802, the network configuration tool 402 identifies a group of data flows that pass through an output port 304 of a switch 108. The network configuration tool 402 may identify the group of data flows that pass through the output port 304 from a set of network description files. For example, the network configuration tool 402 may receive a set of network description files defining devices 102, a network topology, and data flows for a time-sensitive network 100.

The group of data flows may include multiple individual data flows that originate from different sources 104, are travelling along different paths, and are directed to different destinations 110. Further, the group of data flows may include data received at different input ports of the switch 108. For example, the group of data flows may include a first data flow that arrives at the switch 108 via a first input port and a second data flow arrives at the switch 108 via a second input port that is different than the first input port.

At operation 804, the network configuration tool 402 determines a first burst size value for each input port of the switch based on data received at the input port that passes through the output port 304 and is included the group of data flows.

At operation 806, the network configuration tool 402 determines a second burst size value for each input port of the switch based on data received at the input port that passes through the output port and is not included the group of data flows At operation 808, the network configuration tool 402 determines a burst size value of the group of data flows based on the first burst size value and the second burst size value determined for each input port of the switch. For example, the network configuration tool 402 may use the aforementioned group-based algorithm to determine the burst size value of the group of data flows. In some embodiments, determining the burst size value of the group of data flows may involve determining a burst size value of an output port of a subsequent switch 108 along a data path from which at least a portion of the group of data flows was received by the switch 108.

The burst size value of the group of data flows may be used to calculate other values of the output port 304, such as a maximum memory occupancy value and a maximum delay. These values may be used by the network configuration tool to generate routing parameters and performance guarantees for configuring a time-sensitive network 100. For example, the routing parameters may define a sequence of switches 108 through which data flows should be routed to reach their intended destinations 110, and the performance guarantees may define bounds on buffer sizes and delays at the switches 108 in the time-sensitive network 100.

Software Architecture

Figure 9:
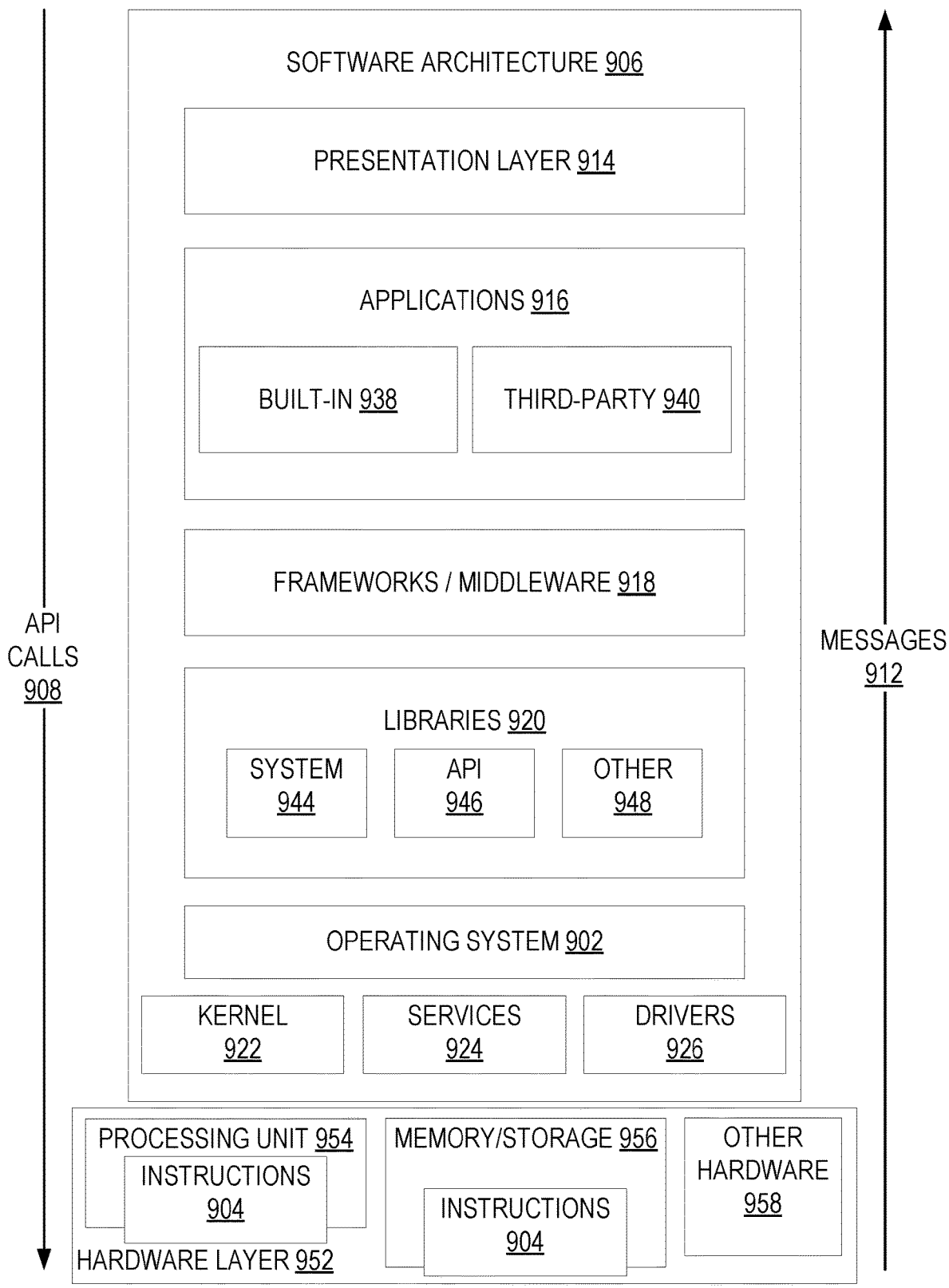
FIG. 9 is a block diagram illustrating an example software architecture, which may be used in conjunction with various hardware architectures herein described.

FIG. 9 is a block diagram illustrating an example software architecture 906, which may be used in conjunction with various hardware architectures herein described. FIG. 9 is a non-limiting example of a software architecture 906 and it will be appreciated that many other architectures may be implemented to facilitate the functionality described herein. The software architecture 906 may execute on hardware such as machine 1000 of FIG. 10 that includes, among other things, processors 1004, memory 1014, and (input/output) I/O components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules 956, which also have executable instructions 904. The hardware layer 952 may also comprise other hardware 958.

In the example architecture of FIG. 9, the software architecture 906 may be conceptualized as a stack of layers where each layer provides particular functionality, such as the Open Systems Interconnection model (OSI model). For example, the software architecture 906 may include layers such as an operating system 902, libraries 920, frameworks/middleware 918, applications 916, and a presentation layer 914. Operationally, the applications 916 and/or other components within the layers may invoke application programming interface (API) calls 908 through the software stack and receive a response such as messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphical user interface (GUI) functions, high-level resource management, high-level location services, and so forth. The frameworks/middleware 918 may provide a broad spectrum of other APIs that may be used by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
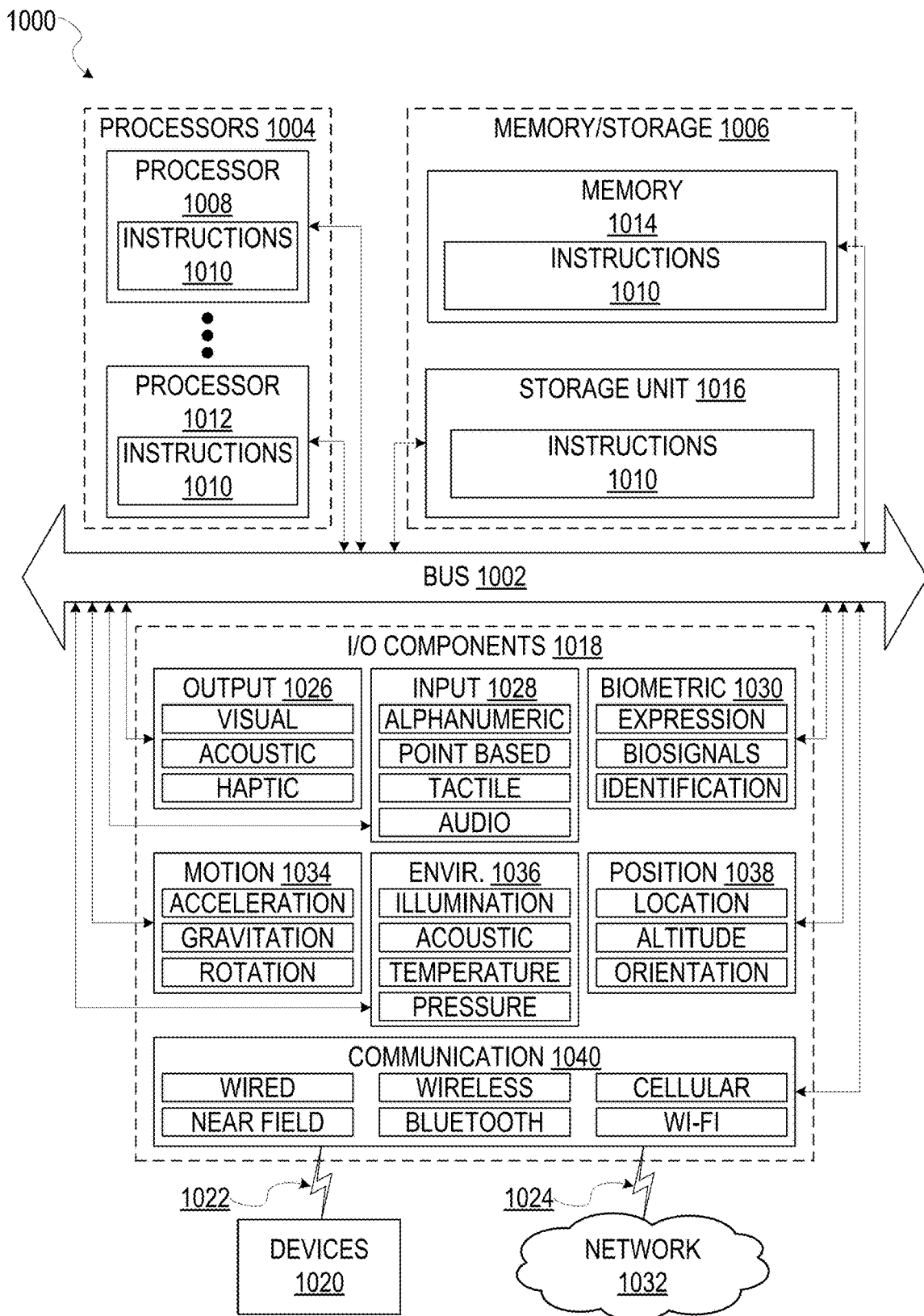
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions 904 from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1000 capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1024 and coupling 1022, respectively. For example, the communication components 1040 may include a network interface component or other suitable device to interface with the network 1032. In further examples, communication components 1040 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a USB).

Moreover, the communication components 1040 may detect identifiers or include components operable to detect identifiers. For example, the communication components 1040 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 1010 for execution by the machine 1000, and includes digital or analog communications signals or other intangible medium to facilitate communication of such instructions 1010. Instructions 1010 may be transmitted or received over the network 1032 using a transmission medium via a network interface device and using any one of a number of well-known transfer protocols.

"CLIENT DEVICE" in this context refers to any machine 1000 that interfaces to a communications network 1032 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1032.

"COMMUNICATIONS NETWORK" in this context refers to one or more portions of a network 1032 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1032 or a portion of a network 1032 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1010 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1010. The term "machine-readable medium" shall also be taken to include any medium, or combination of multiple media, that is capable of storing instructions 1010 (e.g., code) for execution by a machine 1000, such that the instructions 1010, when executed by one or more processors 1004 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1004) may be configured by software (e.g., an application 916 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1004 or other programmable processor 1004. Once configured by such software, hardware components become specific machines 1000 (or specific components of a machine 1000) uniquely tailored to perform the configured functions and are no longer general-purpose processors 1004. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1004 configured by software to become a special-purpose processor, the general-purpose processor 1004 may be configured as respectively different special-purpose processors (e.g., comprising different hardware components) at different times. Software accordingly configures a particular processor or processors 1004, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1002) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1004 that are temporarily configured (e.g., by software) or permanently configured to perform the relevant operations. Whether temporarily or permanently configured, such processors 1004 may constitute processor-implemented components that operate to perform one or more operations or functions described herein. As used herein, "processor-implemented component" refers to a hardware component implemented using one or more processors 1004. Similarly, the methods described herein may be at least partially processor-implemented, with a particular processor or processors 1004 being an example of hardware. For example, at least some of the operations of a method may be performed by one or more processors 1004 or processor-implemented components. Moreover, the one or more processors 1004 may also operate to support performance of the relevant operations in a "cloud computing" environment or as a "software as a service" (SaaS). For example, at least some of the operations may be performed by a group of computers (as examples of machines 1000 including processors 1004), with these operations being accessible via a network 1032 (e.g., the Internet) and via one or more appropriate interfaces (e.g., an API). The performance of certain of the operations may be distributed among the processors 1004, not only residing within a single machine 1000, but deployed across a number of machines 1000. In some example embodiments, the processors 1004 or processor-implemented components may be located in a single geographic location (e.g., within a home environment, an office environment, or a server farm). In other example embodiments, the processors 1004 or processor-implemented components may be distributed across a number of geographic locations.

"PROCESSOR" in this context refers to any circuit or virtual circuit (a physical circuit emulated by logic executing on an actual processor 1004) that manipulates data values according to control signals (e.g., "commands," "op codes," "machine code," etc.) and which produces corresponding output signals that are applied to operate a machine 1000. A processor 1004 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1004 may further be a multi-core processor having two or more independent processors 1004 (sometimes referred to as "cores") that may execute instructions 1010 contemporaneously.

What is claimed is:

1. A method comprising:
   identifying a group of data flows that pass through an output port of a switch, the group of data flows including at least a first data flow and a second data flow;
   for each respective input port of the first switch:
      determining a first burst size value based on a first subset of data received at the input port that passes through the output port and is included in the group of data flows, and
      determining a second burst size value based on a second subset of the data received at the input port that passes through the output port but is not included in the group of data flows; and
   determining a burst size value of the group of data flows at the output port based on the first burst size value and the second burst size value determined for each input port of the switch.

2. The method of claim 1, wherein the first data flow arrives at the switch via a first input port and the second data flow arrives at the switch via a second input port that is different than the first input port.

3. The method of claim 1, further comprising:
   determining a maximum memory occupancy value for the output port based on the burst size value of the group of data flows at the output port.

4. The method of claim 3, further comprising:
   determining a maximum delay at the output port based on the maximum memory occupancy value.

5. The method of claim 1, wherein determining the burst size value of the group of data flows at the output port comprises:
   determining a burst size value at a second output port of a second switch from which the switch receives at least a portion of the group of data flows.

6. The method of claim 1, further comprising:
   receiving a set of network description files defining devices, a network topology, and data flows in a time-sensitive network, wherein the group of data flows that pass through the output port of the switch are identified from the set of network description files.

7. The method of claim 6, further comprising:
   generating routing parameters and performance guarantees for configuring the time-sensitive network based on the set of network description files, the routing parameters defining a sequence of switches through which data flows should be routed to reach their intended destinations, and the performance guarantees defining bounds on buffer sizes and delays at the switches in the time-sensitive network.

8. A network configuration tool comprising:
   one or more computer processors; and
   one or more computer-readable mediums storing instructions that, when executed by the one or more computer processors, cause the network configuration tool to perform operations comprising:

identifying a group of data flows that pass through an output port of a switch, the group of data flows including at least a first data flow and a second data flow;

for each respective input port of the first switch:
determining a first burst size value based on a first subset of data received at the input port that passes through the output port and is included in the group of data flows, and
determining a second burst size value based on a second subset of the data received at the input port that passes through the output port but is not included in the group of data flows; and determining a burst size value of the group of data flows at the output port based on the first burst size value and the second burst size value determined for each input port of the switch.

9. The network configuration tool of claim 8, wherein the first data flow arrives at the switch via a first input port and the second data flow arrives at the switch via a second input port that is different than the first input port.

10. The network configuration tool of claim 8, the operations further comprising:
determining a maximum memory occupancy value for the output port based on the burst size value of the group of data flows at the output port.

11. The network configuration tool of claim 10, the operations further comprising:
determining a maximum delay at the output port based on the maximum memory occupancy value.

12. The network configuration tool of claim 8, wherein determining the burst size value of the group of data flows at the output port comprises:
determining a burst size value at a second output port of a second switch from which the switch receives at least a portion of the group of data flows.

13. The network configuration tool of claim 8, the operations further comprising:
receiving a set of network description files defining devices, a network topology, and data flows in a time-sensitive network, wherein the group of data flows that pass through the output port of the switch are identified from the set of network description files.

14. The network configuration tool of claim 13, the operations further comprising:
generating routing parameters and performance guarantees for configuring the time-sensitive network based on the set of network description files, the routing parameters defining a sequence of switches through which data flows should be routed to reach their intended destinations, and the performance guarantees defining bounds on buffer sizes and delays at the switches in the time-sensitive network.

15. A non-transitory computer-readable medium storing instructions that, when executed by one or more computer processors of a network configuration tool, cause the network configuration tool to perform operations comprising:

identifying a group of data flows that pass through an output port of a switch, the group of data flows including at least a first data flow and a second data flow;

for each respective input port of the first switch:
determining a first burst size value based on a first subset of data received at the input port that passes through the output port and is included in the group of data flows, and
determining a second burst size value based on a second subset of the data received at the input port that passes through the output port but is not included in the group of data flows; and determining a burst size value of the group of data flows at the output port based on the first burst size value and the second burst size value determined for each input port of the switch.

16. The non-transitory computer-readable medium of claim 15, wherein the first data flow arrives at the switch via a first input port and the second data flow arrives at the switch via a second input port that is different than the first input port.

17. The non-transitory computer-readable medium of claim 15, the operations further comprising:
determining a maximum memory occupancy value for the output port based on the burst size value of the group of data flows at the output port.

18. The non-transitory computer-readable medium of claim 17, the operations further comprising:
determining a maximum delay at the output port based on the maximum memory occupancy value.

19. The non-transitory computer-readable medium of claim 15, wherein determining the burst size value of the group of data flows at the output port comprises:
determining a burst size value at a second output port of a second switch from which the switch receives at least a portion of the group of data flows.

20. The non-transitory computer-readable medium of claim 15, the operations further comprising:
receiving a set of network description files defining devices, a network topology, and data flows in a time-sensitive network, wherein the group of data flows that pass through the output port of the switch are identified from the set of network description files; and
generating routing parameters and performance guarantees for configuring the time-sensitive network based on the set of network description files, the routing parameters defining a sequence of switches through which data flows should be routed to reach their intended destinations, and the performance guarantees defining bounds on buffer sizes and delays at the switches in the time-sensitive network.

\* \* \* \* \*